United States Patent Office 3,079,262
Patented Feb. 26, 1963

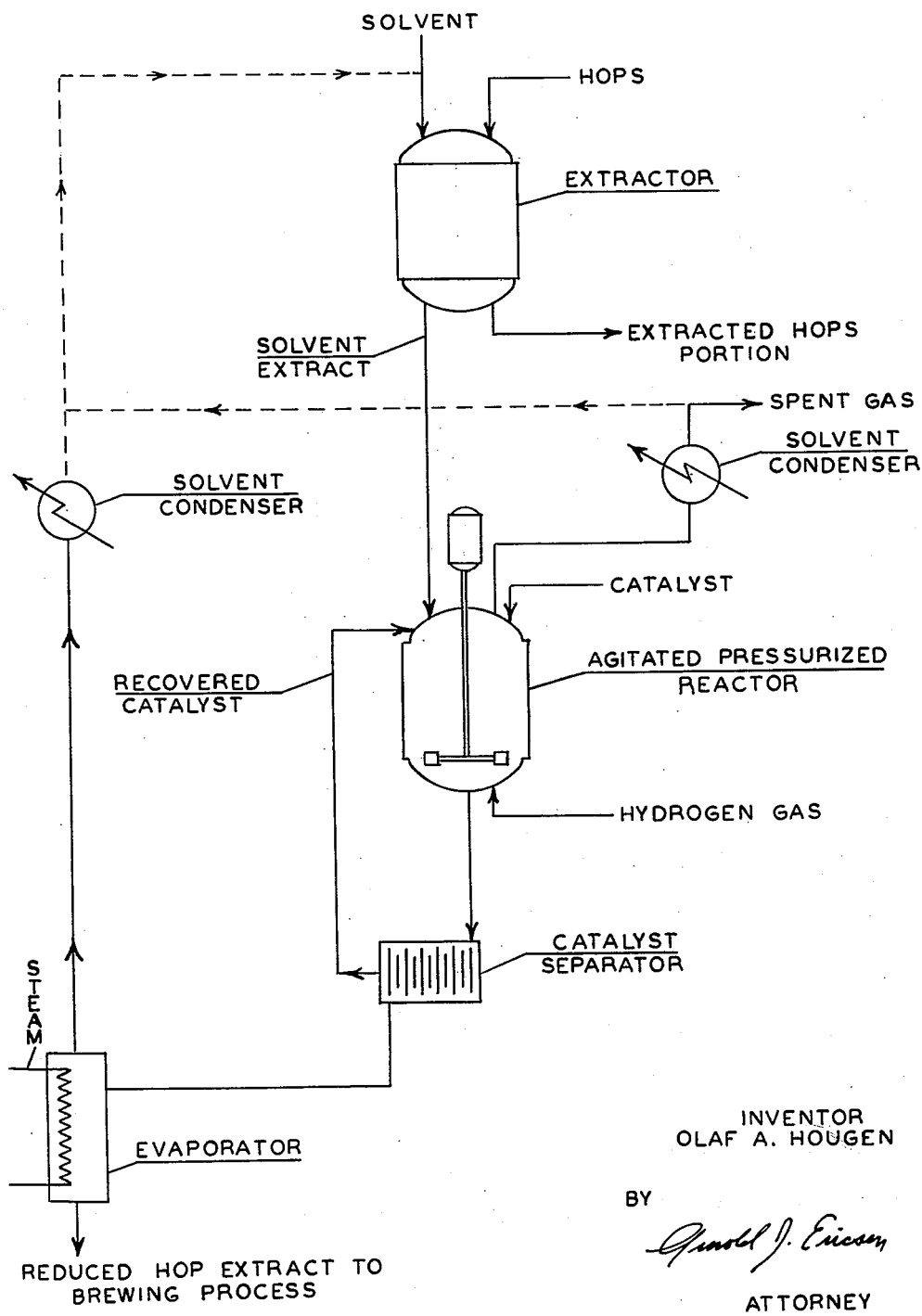

3,079,262
CATALYTIC REDUCTION OF A HOP EXTRACT
Olaf A. Hougen, Madison, Wis., assignor to Miller Brewing Company, Milwaukee, Wis., a corporation of Wisconsin
Filed Oct. 10, 1960, Ser. No. 61,575
2 Claims. (Cl. 99—50.5)

The present invention relates to the production of an improved fermented malt beverage, such as beer or ale, and to a hop extract for use as a bittering agent in the preparation of the improved malt beverage. In particular, this invention relates to the treatment of hop constituents to be used as a bittering agent in the preparation of fermented malt beverages, wherein the finally prepared malt beverage which, on exposure to light, will not degrade to form the characteristic light-struck odor and taste well known in the brewing industry.

It is one of the objects of the present invention to subject an extract of hops to a chemical treatment wherein chemical reduction of the same will produce an improved product, which when added to a malt beverage during processing of the same will provide a beverage free of the light-struck characteristics familiar to those experienced in the art of brewing.

The fact that fermented malt beverages such as beer and ale and similar malt beverages produced from water, barley malt, adjunct and hops lack stability in the presence of light is a matter of public record. It is well known that these beverages are photochemically affected by artificially or naturally produced light in the range of between 2,000 and 8,000 angstroms, producing actinic damage to the beverage, resulting in a product of very undesirable skunky odor and flavor, commonly known in the industry as "light-struck" beer or ale. In addition to the source of energy from sunlight or artificial light, it has been determined that certain sulfur-bearing compounds, when combined with some constituents of hops, will cause the characteristic deleterious photochemical reaction.

The use of a solvent extract from hops for the preparation of malt beverages is well known in the industry. Such extract consists of alpha, beta, gamma resins and similar natural compounds along with the more volatile terpene or essential oils which impart desirable aroma and bittering characteristics to beer and ale.

It is a specific object of this invention to produce a light-stable malt beverage, such as beer or ale, from a solvent extract of hops, in which solvent the constituents normally used in brewing are substantially soluble, and in which solvent the extractable material has been chemically reduced to thereby be rendered incapable of undergoing the deleterious photochemical reaction which produces an otherwise characteristic and undesirable light-struck product.

Another specific object of the present invention is to prepare an extract of hops per se, which extract has been treated to chemically reduce certain constituents of the extracted materials carried thereby, and which reduced constituents may later be used in the preparation of a malt beverage such as beer or ale.

The diagrammatic illustration of the single drawing FIGURE is illustrative of a continuous procedure for practicing the teachings of the present invention, and is set forth as an example of one technique that may be considered for commercial production of a suitably treated hop extract. Examples hereinafter set forth further illustrate means for preparation of the extract of this invention in relatively small quantities by batch process.

With reference to the drawing, whole dried hops or fresh hops, if desired, are introduced into an extractor along with a suitable amount of solvent. The extractor is conventional, and may be in the form of a decanter type and the hops are washed by the solvent until virtually all of the soluble materials have been removed. After the solvent has acted upon the hops, the spent hop portion is removed and disposed of.

The solvent extract is then introduced into a pressurized reactor equipped with an agitator, which may be in the form of motor driven paddles as indicated schematically within the confines of the reactor. Hydrogen gas, used as the reducing agent is also introduced into the reactor under pressure, along with a suitable catalyst, which may take the form of 5% palladium on an alumina carrier, as will later be discussed. In the schematic version illustrated, the catalyst may take the form of a powder and after a suitable reaction time has been completed, may be discharged from the reactor along with the catalytically hydrogenated hop extract constituents, to be introduced into a catalyst separator and recovered for later introduction to the reactor along with fresh catalysts, if desired. The separator has been schematically illustrated, in the drawing as a filter, although it may take the form of a centrifuge.

The spent gas and solvent vapors are also released from the reactor and are introduced into a conventional solvent condenser, whereby the solvent may be returned to the main solvent return line indicated by the dotted path emanating from the condenser. The spent gas may be discharged to atmosphere from the solvent condenser.

After being separated from the catalyst, the reduced solvent extract is next introduced into an evaporator of conventional type and which may be steam heated. The volatile solvent is evaporated to be introduced into a conventional solvent condenser to be returned to the extractor along with newly added solvent to make up for any losses occurring during the processing. The hydrogenated hop extract is then discharged from the evaporator for use in the brewing process in accordance with established brewing practice.

For purposes of illustration, the following examples set forth herein have been carried out in batch type procedures in a reactor comprising a one liter turbine-agitated autoclave at a controlled temperature and pressure. A solvent extract of hops, with approximately 20% of the total solid content comprising the catalyst, is added to the autoclave to which hydrogen is then added under a controlled constant pressure. This system may also be run as a constant volume operation permitting the hydrogen pressure to cycle from approximately 200 pounds per square inch, gage, down to 100 pounds per square inch, gage, with subsequent additions of hydrogen as the minimum pressure has been reached. The temperatures used in these reductions have ranged between about 160° F. to about 250° F. The pressures and temperatures of reduction are not intended to be limiting factors, but have been set forth as nominal range of operation and a broad approach to the reduction to practice of the invention.

The following examples will serve to specifically indicate the condition under which the chemical reductions have been conducted:

Example 1

An hexane extract of dried hops is made by pumping the hexane solvent through the hops until the solvent runs virtually clear. It has been found that portions of the hops which will dissolve in the hexane may be extrated upwardly of 99%. The hexane extract is then evaporated to provide approximately 50% solids. 125 ml. of the evaporated hexane extract of the present example contained 25 grams of solids of which 11.55 grams was humulone and 7.59 grams was determined to be lupulone according to spectrophotometric analysis in accordance with the procedures set forth by Lewis et al., Anal. Chem., vol. 26, p. 983, 1954. The extract was placed in the one liter autoclave and 5.0 grams of 5% palladium on an alumina carrier in powdered form were added thereto. The contents of the autoclave were then diluted to a total volume of 500 ml. with hexane. The autoclave was sealed, charged with hydrogen at 225 p.s.i., gage, and the reaction allowed to proceed with constant agitation for 192 minutes at a temperature of between 170° F. and 180° F. At the end of the reaction, the autoclave pressure had dropped to 112 p.s.i., gage, which is equivalent to 0.127 mole of hydrogen consumption.

The reaction mixture was then cooled, filtered free of the catalyst, and evaporated in vacuo to remove the solvent. The residue was taken up in ethanol.

A suitable aliquot of the reduced extract was added to a conventional brewing wort, which wort was finished in usual fashion and was found to be insensitive to light. The test to determine light sensitivity involved the exposure of sample finished beer in accordance with the present invention and a control commercially prepared sample both being placed in commercial 12 oz. clear glass bottles and subjected to the light of an illuminance emanating from a light box containing two banks of 40 watt light bulbs. The bottles were set between the banks for an exposure period of two hours. Each of the banks contained one 40 watt daylight fluorescent light tube and one 40 watt black light bulb to provide light rays in both visible and near ultraviolet range. Both olfactory and organoleptic tests were made by a panel of experts for comparison with suitable control samples for comparison purposes.

Example 2

125 ml. of an hexane extract of dried hops containing 25 grams of solids which analyzed as 12.1 grams of humulone and 6.18 grams of lupulone was placed in the one liter stirred autoclave along with 7.5 grams of 5% palladium on alumina, and the contents were diluted to 500 ml. with hexane. The autoclave was then sealed, charged with hydrogen at 225 p.s.i., gage, and the reaction permitted to proceed with constant agitation for 125 minutes at a temperature range of between 170° F. and 180° F. The pressure had dropped to 136 p.s.i., gage, at the end of the reaction, which is equivalent to 0.106 mole of hydrogen consumption.

The reaction mixture was cooled, centrifuged free of catalyst, and then evaporated in vacuo to remove the solvent. The residue was then dissolved in ethanol to desired strength and added to the brew kettle for normal preparation and finishing of the sample beer. This resulting beer was also determined to be light stable.

Example 3

The amount of catalyst was increased in the present example, and in this case, 125 ml. of hexane extract of hops containing 25.125 grams of solids was placed into the one liter stirred autoclave. The components were diluted to 500 ml. with hexane and 10.05 grams of 5% palladium and an alumina carrier was then added. The autoclave was sealed, pressurized to 225 p.s.i., gage, with hydrogen, and the reaction allowed to proceed with stirring for 120 minutes at a temperature of between 165° F. and 180° F. At the end of the reaction, the autoclave pressure was 122 p.s.i., gage, which is equivalent to 0.122 mole of hydrogen consumed.

The reaction mixture was cooled, centrifuged free of catalyst, and the solvent evaporated in vacuo. The residue was taken up in ethanol, and an aliquot was added to the brew kettle and the beer was processed and finished in the usual fashion by fermentation and aging. Again, the finished beer was found to be light stable.

Example 4

In the present example, 352 ml. of a hexane extract of dried hops containing 152.77 grams of solids, analyzing 43.82 grams of humulone and 40.53 grams of lupulone was placed in the one liter stirred autoclave. 28.65 grams of 5% palladium on alumina was added as a slurry with 50 ml. of hexane. The autoclave was sealed, pressurized with hydrogen at 100 lb. p.s.i., gage, and the reaction allowed to proceed at constant pressure for 120 minutes at 250° F. A total of 0.669 mole of hydrogen was consumed. It will be observed that the pressure was considerably reduced in this case from the previous example.

The extract was cooled, centrifuged free of catalyst, evaporated in vacuo to remove the solvent and taken up in ethanol. Upon addition of an aliquot of the extract to the brew kettle, it was found that the resulting beer obtained after normal fermentation and aging was light stable.

Example 5

In the present case, 500 ml. of an hexane extract of hops containing 95.3 grams of solids was transferred to the one liter autoclave and 28.6 grams of 5% palladium on carbon was added thereto. The autoclave was sealed and hydrogen was fed to the reactor through a flow meter at 115 lb. p.s.i., gage. The reaction was allowed to proceed for 34 minutes at a temperature of 175° F. to 180° F. A total of 1.077 moles of hydrogen was consumed.

The reaction mixture was cooled, centrifuged to remove the catalyst, and evaporated in vacuo to remove the solvent. The residue was dissolved in ethanol, and an aliquot was admitted to the brew kettle. The resulting finished beer after normal processing was also found to be light stable.

It will thus be apparent that the present invention has provided a means of processing a hop extract which when added to the normal processing of beer or ale will render the said fermented malt beverage stable to light, and which process includes the catalytic hydrogenation of the certain hop constituents which normally cause the finished beer to be light sensitive when said constituents react with other constituents comprising materials for the preparation of malt beverages such as beer and ale.

I claim:

1. A method of preparing a bittering agent for a fermented malt beverage which includes the step of subjecting hops to the action of a solvent in which the principal bittering constituents used in brewing said beverage are substantially soluble to form a solvent extract, subjecting the solvent extract to the action of a chemical reducing agent, and separating the reduced components from the reducing agent.

2. A method of preparing a bittering agent for a fermented malt beverage which includes the step of subjecting hops to the action of a solvent in which the principal bittering constituents used in brewing said beverage are substantially soluble to form a solvent extract, subjecting the solvent extract to the action of hydrogen in the presence of a reduction-type catalyst, and separating the reduced components from the hydrogen and catalyst.

References Cited in the file of this patent

UNITED STATES PATENTS 2,647,837     Salac                 Aug. 4, 1953

OTHER REFERENCES

Brown et al.: Chemical Society Journal, 1959, pp. 545 to 553.